United States Patent [19]

Grasso et al.

[11] Patent Number: 5,233,463
[45] Date of Patent: Aug. 3, 1993

[54] ACTIVE FIBER OPTICAL AMPLIFIER FOR A FIBER OPTICS TELECOMMUNICATION LINE

[75] Inventors: Giorgio Grasso, Monza; Aldo Righetti, Milan, both of Italy

[73] Assignee: Pirelli Cavi S.p.A., Milan, Italy

[21] Appl. No.: 857,740

[22] Filed: Mar. 26, 1992

Related U.S. Application Data

[63] Continuation-in-part of Ser. No. 839,056, Feb. 18, 1992, Pat. No. 5,204,923, which is a continuation of Ser. No. 552,918, Jul. 16, 1990, and a continuation-in-part of Ser. No. 824,742, Jan. 21, 1992, Pat. No. 5,138,483, which is a continuation of Ser. No. 604,120, Oct. 26, 1990, and a continuation-in-part of Ser. No. 699,920, May 14, 1991.

[30] Foreign Application Priority Data

Apr. 15, 1991 [IT] Italy ............... MI 91 A 001029

[51] Int. Cl.$^5$ .................. G02V 6/26; H01L 15/00
[52] U.S. Cl. ........................ 359/341; 359/179
[58] Field of Search ........... 359/160, 174, 179, 341, 359/345

[56] References Cited

U.S. PATENT DOCUMENTS 5,074,633 12/1991 Cohen et al. ................. 385/43
5,115,338 5/1992 DeGiovanni et al. ........ 359/337

OTHER PUBLICATIONS

IEEE Photonics Technology Letters vol. 2. No. 12. Dec. 1990 New York, US pp. 866-868.
Electronics Letters. vol. 25, No. 20, Sep. 28, 1989, Engage GB pp. 1393-1394.
Technical Digest Series, Optical Amplifier and Their Applications vol. 13, 1990, pp. 126-129.
Electronics Letters vol. 26, No. 10, May 1, 1990, Engage GB pp. 661-662.
IEEE Photonics Technology Letters vol. 3, No. 3, Mar. 1991, New York, US pp. 2530244.
Optics Communications, vol. 81, No. 1/2, Feb. 1, 1991, Amsterdam NL pp. 23-26.
Righetti et al, Proceeding of European Conference on Optical Communication, 1989 pp. 42-46.
Inoue et al, Electronics Letters, vol. 25, #9, Apr. 27, 1989, pp. 594-595.
Iqbal et al, IEEE Int. Conf. on Communic., Atlanta, Ga.; Apr. 19, 1990, Abstract only supplied herewith.
Baker, R.; Physics World, Mar. 1990, 4 pages, entitled "Optical Amplification".
Giwlett et al, IEEE Photonics Tech. Lett., vol. 2, #3, pp. 211-213, Mar. 1990; abst. only supplied.
Hermi et al, IEEE Photonics Tech. Lett., vol.; #4, pp. 277-278, Apr. 1990; abst. only supplied.

Primary Examiner—Nelson Moskowitz
Attorney, Agent, or Firm—Brooks Haidt Haffner & Delahunty

[57] ABSTRACT

The optical amplifier (1) comprises two amplifying stages, an upstream amplifying stage ($S_M$) and a downstream amplifying stage ($S_V$). The former stage comprises an upstream active fiber (9) doped with a fluorescent dopant and connected serially to the optical fiber line (2), an upstream optical coupler (10) connected serially downstream from the upstream section of active fiber (9), a laser diode (11) for supplying pumping energy towards the upstream active fiber (9) through the coupler (10), said coupler being oriented to cause pump energy travel towards said upstream active fiber (9) in the opposite direction from the predetermined signal direction (S); the latter stage ($S_V$) comprises a downstream active fiber (3) doped with a fluorescent dopant and connected serially in the optical fiber (2), a downstream optical coupler (4) connected serially in the downstream active fiber (3), a laser diode (5) for supplying pumping energy into the downstream active fiber (3) through the downstream coupler (4), a first optical isolator (7) serially connected upstream of the downstream active fiber (3), a second optical isolator (8) serially connected downstream from the downstream active fiber (3).

13 Claims, 1 Drawing Sheet

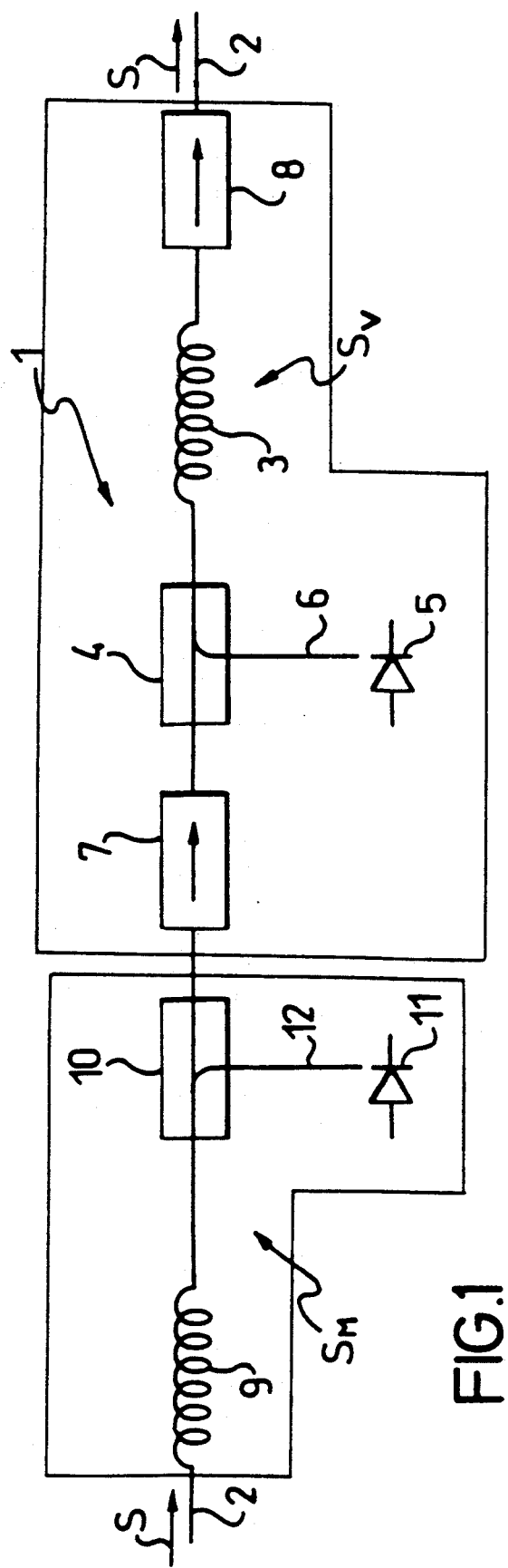
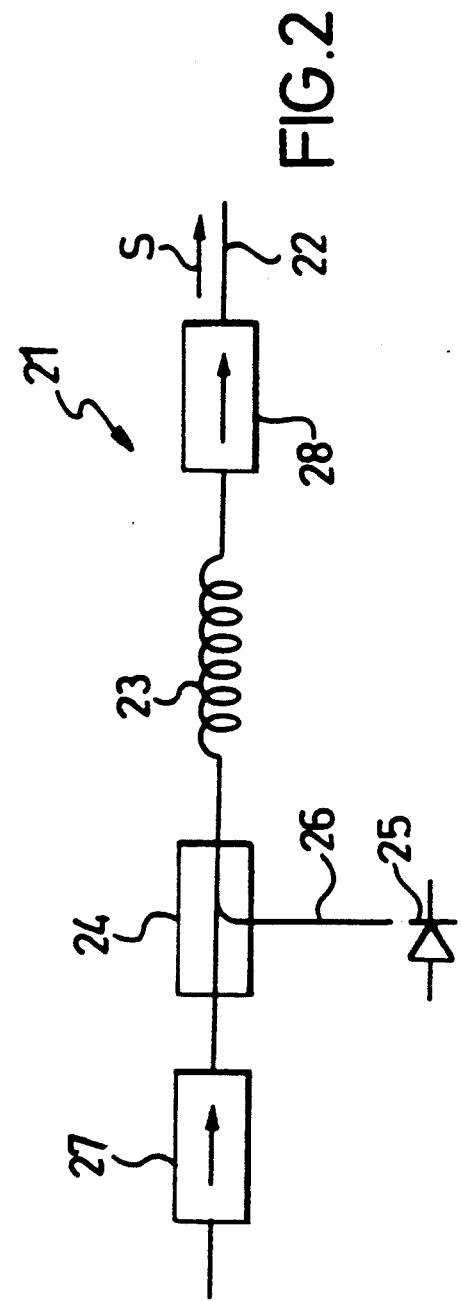
FIG.1
FIG.2

ACTIVE FIBER OPTICAL AMPLIFIER FOR A FIBER OPTICS TELECOMMUNICATION LINE

This application is a continuation-in-part of application Ser. No. 07/839,056, filed Feb. 18, 1992 now U.S. Pat. No. 5,204,923 and entitled "Unit For Amplifying Light Signals In Optical Fiber Transmission Lines", which is a continuation of application Ser. No. 07/552,918, filed Jul. 16, 1990; a continuation-in-part of application Ser. No. 07/824,742, filed Jan. 21, 1992, issued Aug. 11, 1992 as U.S. Pat. No. 5,138,483 and entitled "Low-Noise Active Fiber Optical Amplifier With Pumping Power Reflector", which is a continuation of application Ser. No. 07/604,120, filed Oct. 26, 1990; and a continuation-in-part of application Ser. No. 07/699,920, filed May 14, 1991 and entitled "Unit for Amplifying Light Signals in Optical Fiber Transmission Lines", all of which include the names of the present inventors.

DESCRIPTION

This invention relates to an active fiber optical amplifier for a fiber optics telecommunication line through which a signal is caused to pass in a predetermined direction.

Known are fiber optics telecommunication lines wherein the transmission signal is a suitably modulated light signal guided through optical fibers; such lines are valued especially because of their ability to transmit a signal over great distances with low attenuation.

Also recognized is that, in order to both have the transmission range increased and a signal of suitable power fed to the input of some receiving apparatus, the signal may have to be amplified; such amplifications can be either provided by repeaters or optical amplifiers.

In the former instance, the optical signal would be converted into a different, usually electric, form which is then amplified, as by electronic apparatus, and converted back into a light signal; this is the simpler method, but also one that introduces transmission rate limitations due to the signal transmission rate being conditioned by the processing rate of the amplifying apparatus employed.

By contrast, in the latter instance, the telecommunication light signal would be amplified as it is, namely in the optical form. For this purpose, a so-called "active" fiber section is provided by adding suitable dopants to an optical fiber; into this active fiber, so-called "pumping" luminous energy is supplied, which has a shorter wavelength than the signal and excites the electrons of the dopants present in the fiber to a lasing level. The passage of a signal at a wavelength corresponding to said lasing level is apt to cause the decay from said lasing level to the ground state of the dopant electrons, with an associated coherent light emission, thereby amplifying the signal.

The pumping energy is usually provided by a laser source, injected into an optical fiber, and inserted into the fiber that carries the signal by means of a dichroic coupler (or optical multiplexer). Within the active fiber, the pumping energy propagates with progressive attenuation of its luminous power along the fiber, mainly due to energy being transferred to the dopants, exciting them to the lasing level.

The minimum luminous power required at each section of the active fiber to produce amplification gain is referred to as the threshold power; above this level, there would occur a so-called reversal of population among the dopant atoms, meaning that the number of the atoms in the excited lasing level would be larger than the number of the atoms in the ground, unexcited state.

Where the luminous power exceeds the threshold level, the probability of the signal photons meeting with an excited atom and, accordingly, generating a second photon (with decay of the atom to the ground state) is higher than the probability that the photons meet with an atom in the ground state and are absorbed thereby (with excitation of the atom to an higher level). The outcome of this is a gain in the signal which is the higher the greater is the number of the atoms in the lasing state, i.e. the more complete is the population inversion.

However, the desired amplifying effect is always accompanied by an undesired effect of noise introduction.

This may originate essentially as noise from random-type light emissions in the line, or be due to signal attenuation brought about by components being connected in the line (insertion attenuations), which would lower the level of the signal relatively to the noise and thus make the weight of the latter more important.

A first cause of disturbance is associated with the spontaneous emission from the active fiber showing up when its atoms are in the excited state; in fact, after a time delay, the excited dopant atoms decay spontaneously to the ground state from the lasing level, emitting a photon. The diffused random brightness thus generated constitutes noise affecting a signal being transmitted. This noise intensity increases with population inversion, i.e. as the number of atoms in the excited state increases; it has been found, however, that as inversion decreases, the noise due to spontaneous emission decreases at a lower rate than gain. Efforts have been made, therefore, to keep the inversion level high throughout the active fiber length, by providing a selective mirror element which could reflect just the pumping light, thereby the latter flowed through the active fiber in both directions to provide a smaller variation in pumping power along the fiber and a reduction in the above-mentioned noise. Reference can be made in this respect to said U.S. patent application Ser. No. 07/604,120 (corresponding to Italian Patent Application No. 22196-A/89 and European Patent Application No. EP 90202730.6) by this same Applicant.

In connection with noise contributions from the supply directions of the pumping energy, and different gains, see also "1990 TECHNICAL DIGEST SERIES VOL. 13, Optical Amplifiers and their Applications", pp. 126-129.

Another type of noise generated in active fiber amplifiers is the so-called interferometric noise, which is due to beats occurring between the forward signal and reflected signals within one fiber; such signals are typically caused by discontinuity surfaces (which can be avoided or at least limited) but also by unavoidable (Rayleigh's, Brillouin's) scattering phenomena taking place within the fiber itself. In order to prevent the reflected signals from propagating, and hence subdue interferometric noise, the use of so-called optical isolators has been proposed which only admit the signals in one direction. See on the subject said U.S. patent application Ser. No. 07/699,920 (corresponding to Italian Patent Application No. 20434-A/90 and European Patent Application No. EP 91108162.8) by this same Applicant.

This invention relates to an active fiber optical amplifier for a fiber optics telecommunication line through which a signal is caused to pass in a predetermined direction, of the type comprising an active fiber doped with a fluorescent dopant and an optical coupler through which pumping luminous energy is fed into the active fiber, characterized in that it comprises an upstream amplifying stage and a downstream amplifying stage, consecutively connected along the line in the direction of the transmission signal, in which the upstream amplifying stage comprises an upstream active fiber doped with a fluorescent dopant and connected serially to the optical fiber line, an upstream optical coupler connected serially downstream from the upstream active fiber, means for supplying pumping energy towards the upstream active fiber through the coupler, said coupler being oriented to cause pump energy travel towards said upstream active fiber in the opposite direction from the predetermined signal direction, and the downstream amplifying stage comprises a downstream active fiber doped with a fluorescent dopant and connected serially in the optical fiber, a downstream optical coupler connected serially in the downstream active fiber, means of supplying pumping energy into the downstream active fiber through the downstream coupler, a first optical isolator serially connected upstream of the downstream active fiber, a second optical isolator serially connected downstream from the downstream active fiber.

This approach, which apportions the amplification to two discrete amplifying stages, might at once appear such as to expand the noise introduced on account of the larger number of components connected in the line; it has been found that, on the contrary, it affords major advantages just in terms of a reduction in the noise being introduced, as explained herein below.

The provision of an upstream stage where the transmission signal is introduced into the amplifying fiber with no attenuation and the signal is only amplified to a limited extent allows the downstream stage to be input a signal which is at a sufficiently high level to be amplified to the desired value with negligible noise; stated otherwise, in assessing the overall noise of the amplifier, the contribution from the attenuations due to the discrete elements (couplers, isolators) present is reduced by a factor equal to the active fiber gain.

As for the noise generated upstream in the active fiber, this comprises both the interferometric noise component and the noise component from spontaneous decay of the excited dopant atoms; whereas interferometric noise is proportional to the fourth power of the gain in the active fiber, the noise from spontaneous decay is proportional to the degree of inversion in the population of dopant atoms.

It has been found, according to this invention, that by selecting for the upstream active fiber a sufficiently low gain, the interferometric noise in that fiber can be made negligible, and that by contemporarily selecting for the upstream active fiber a sufficient gain, the contribution to the overall noise figure of the amplifier from the attenuations and noise downstream of the amplifier can be made negligible.

The optical coupler can be oriented so that the pumping energy is supplied into the downstream active fiber, either in the same direction as the signal, or in the opposite direction, or even in both directions.

In the former, and preferred, case, the coupler would be positioned upstream of the active fiber; in the latter case, the coupler would be positioned between the active fiber and the upstream isolator.

For the upstream section of the active fiber, the pumping energy supply direction of choice runs instead opposite from that of the transmission signal because the noise from the attenuation due to the coupler being connected in would be then attenuated by a factor equal to the gain in the active fiber itself, as would all noises downstream from said upstream active fiber; in other words, no attenuating elements are introduced at a location where the signal is at its lowest level.

Preferably, the gain of the upstream active fiber is below a predetermined maximum value, such that the interferometric noise in the upstream active fiber can be made negligible, and above a minimum value whereby the contribution of the overall noise figure of the amplifier from the combined noise figure of the components downstream from the upstream section of active fiber will be less than 1/10 the noise figure of the upstream section of the active fiber.

More preferably, the predetermined maximum value is 100 times lower than the geometric mean of the reflectivities upstream and downstream from the upstream section of active fiber. Still more preferably, the predetermined maximum value is 100 times lower than the geometric mean of the reflectivity due to Rayleigh's diffusion through the line fiber upstream of the upstream section of active fiber, and the reflectivity of the downstream isolator toward the active fiber.

Gain values within the range of 8 to 15 dB are preferred.

According to a further aspect, the present invention relates to a method for amplifying an optical signal in a fiber optics telecommunication line, through which a signal is caused to pass in a predetermined direction, by means of an optical active fiber amplifier, which comprises the steps of:

amplifying the signal in an upstream amplifying stage, having an upstream active fiber directly coupled to the telecommunication line, with a gain less than a predetermined maximum value, such as to make the interferometric noise in the upstream active fiber negligible, and more than a maximum value, such that the contribution to the overall noise figure of the amplifier from the noise figure of the combined components downstream from the upstream active fiber section is made less than 1/10 the noise figure of the upstream active fiber section; and successively further amplifying the signal in a downstream amplifying stage, consecutively connected along the line in the direction of the transmission signal, with a gain which is the complement to the desired overall amplifying gain of the amplifier, preventing reflections of signal into the downstream amplifying stage.

Preferably said predetermined maximum value is 100 times lower than the geometric mean of the reflectivities upstream and downstream of the upstream active fiber.

More preferably said predetermined maximum value is 100 times lower than the geometric mean of the reflectivity from Rayleigh's diffusion through the line fiber upstream of the upstream active fiber and the reflectivity of the downstream amplifying stage toward the upstream active fiber.

Further features and advantages of an optical amplifier according to the invention will become more clearly apparent from the following detailed description of a preferred embodiment thereof, to be read in conjunction with the accompanying drawings, where:

FIG. 1 illustrates an amplifier according to the invention, in diagrammatic form; and FIG. 2 illustrates for comparison, in diagrammatic form, an amplifier according to said application Ser. No. 839,056.

An optical amplifier 1 embodying this invention is connected serially in an optical fiber 2, also referred to herein as line fiber, through which an optical transmission signal is driven in a predetermined direction, from left to right in the diagram as indicated by arrows S.

The amplifier 1 comprises a downstream section of active fiber 3, also referred to herein as downstream active fiber, which connects serially to the line fiber 2, and a downstream dichroic coupler 4 connected serially in the optical fiber 2 upstream of the downstream active fiber section 3.

The active fiber 3 is fed, via the coupler 4 and in the same direction as the signal, a luminous pumping energy with an appropriate wavelength which is supplied from a suitable supply means 5. First and second optical isolators, 7 and 8, are connected serially in the fiber 2, respectively upstream of, and downstream from, the downstream active fiber 3.

The active fiber 3, coupler 4, pumping means 5, and isolators 7, 8 jointly form a downstream amplifying stage $S_V$.

In addition, the amplifier 1 comprises an upstream section of active fiber 9, also referred to herein as upstream active fiber, which is connected serially in the optical fiber 2, at a location upstream of the first isolator 7, and an upstream dichroic coupler 10, which is connected serially in the optical fiber 2 between the upstream active fiber 9 and the first isolator 7.

Through coupler 10, the upstream active fiber 9 is fed, in the opposite direction from the signal direction, a luminous pumping energy with a suitable wavelength, being supplied by a suitable supply means 11. No isolator is provided upstream of active fiber 9.

The active fiber 9, coupler 10, and pumping means 11 jointly from an upstream amplifying stage $S_M$.

The active optical fibers, 3 and 9, of the two amplifying stages are optical fibers which are core doped with a reflective index modifier, such as germanium or aluminum, to obtain a desired profile for the refractive indices, and which are made "active" by the added presence of a fluorescent dopant, preferably erbium, in the core.

Fibers of the type described above are known in the art, e.g. from the aforementioned prior patents.

The luminous pumping energy supply means, 5 and 11, consist preferably of conventional laser diodes of suitable power which connect to their respective couplers, 4 and 10, through respective optical fiber sections, 6 and 12.

The optical couplers 4 and 10 comprises, of preference, conventional fused fiber couplers, not further described herein.

This represents a preferable solution in that it eliminates for such components reflective phenomena due to the presence of air-to-glass interfacing surfaces, likely to add to the interferometric noise.

The pumping powers supplied into the downstream and upstream active fiber sections are to maintain a higher power than threshold power at the section more remote from the coupler, that is to maintain a state of complete population inversion in the fibers.

In an amplifier 1 according to the invention, having the above described construction, the overall noise power appearing at its input can be obtained from equation (I) below:

$$N_A = N_{AM} + N_{AV} / (A_{acc} A_{is} G_M) \quad (I)$$

where $N_{AM}$ and $N_{AV}$ are the noises generated in the upstream and downstream active fibers 9 and 3, respectively, $A_{acc}$ is the sum of the attenuations of couplers 10 and 4, $A_{is}$ is the attenuation of isolator 7, and $G_M$ is the gain of the upstream active fiber 9.

The attenuations from the insertion of passive optical components along the line, such as optical couplers, isolators, etc., are to be assumed in the general range of 0.5 to 2 dB for each component, with commercially available optical components.

The noise for the upstream active fiber 9 can be obtained, in turn, from the following equation (II):

$$N_{AM} = N_{AMdec} + N_{AMinterf} \quad (II)$$

where $N_{AMdec}$ is the noise from spontaneous decay, and $N_{AMinterf}$ is interferometric noise.

These noise components are given by the following equations (III) and (IV):

$$N_{AMdec} = n_{sp} h \nu (G_{M4} - 1) / G_M \quad (III)$$

$$N_{Aminterf} = H G_M R_i R_o \quad (IV)$$

where $n_{sp}$ is the degree of inversion in the upstream active fiber 9, h is Planck's constant, $\nu$ is the frequency of the light signal, H is a constant, and $R_i$ and $R_o$ are the reflectivity values at the input and output ends of active fiber 9.

Further information about interferometric noise can be had from ELECTRONICS LETTERS, Sep. 28, 1989, pages 1393 and 1394.

It can be seen from equation (I) that by selecting a high value of $G_M$, the weight of the noise introduced downstream from the active fiber 9 can be made negligible with respect to the noise introduced into the active fiber 9 itself, namely:

$$N_A \approx N_{AM}. \quad (V)$$

This result can be obtained, in accordance with this invention, by selecting a value of $G_M$ such that the contribution to the overall noise figure from the noise figure of all the components downstream from active fiber 9 is less than 1/10 of the noise figure of fiber 9 itself; preferably, this gain would exceed 8 dB.

Noise figure is a quantity, well known in the art, which may be defined as the ratio of the overall noise power at the output of a system to the power of the input noise to the system.

On the other hand, it can be seen from equations (II) and (IV) that by selecting a low value of $G_M$, the interferometric noise contribution can be made negligible compared to spontaneous decay noise, namely:

$$N_{AM} \approx N_{AMdec} \quad (VI)$$

To this aim, the value of $G_M$ is kept, according to the invention, below a predetermined value; specifically, $G_M$ is 100 times lower than the geometric mean of the reflectivity due to Rayleigh's scattering through the optical fiber 2 upstream of the active fiber 9, and the reflectivity of isolator 7, or more generally, than the geometric mean of the reflectivities upstream of and downstream from the active fiber toward the active fiber itself; this gain is preferably lower than 15 dB.

It should be noted that the optical isolator 7 located directly downstream from the upstream active fiber section 9 has a limited reflectivity toward section 9 at the wavelength of the transmission signal, preferably exceeding the reflectivity from Rayleigh's scattering through the line optical fiber 2 by no more than 10 dB.

A typical value for reflectivity from Rayleigh's scattering through a line fiber is approximately 30 dB, and optical isolator 7 may have a reflectivity of 40 dB toward active fiber 9.

With an amplifier according to the invention, and the upstream active fiber 9 sized within the gain range specified above, the overall noise of the amplifier shows to be substantially coincident with just the spontaneous noise decay in the fiber 9, namely:

$$N_A \approx NAM_{dec} \qquad (VII)$$

The result given by equation (VII) shows that amplifier 1 affords high gain with a minimum of noise.

In a preferred embodiment, the active optical fibers, 3 and 9, are silicon fibers doped with germanium and having a numerical aperture $NA = 0.19$ and a cut-off wavelength $\lambda_c = 900$ nm.

The fibers 3 and 9 are made active by the presence of erbium ($Er^{+++}$ ions), as provided by doping the fibers with $Er_2O_3$; the amount of the dopant present corresponds to a signal attenuation of 7.8 dB/m at a wavelength $\lambda = 1536$ nm.

The optical transmission signal has wavelength $\lambda = 1536$ nm, corresponding to the so-called "third window" where attenuation in the line is minimal.

The pumping energy supply means, 5 and 11, comprise respective laser diodes having powers of 15 and 10 mW, respectively, and emission wavelength $\lambda = 980$ nm.

The optical couplers, 4 and 10, are preferably fused fiber couplers.

In the exemplary embodiment described, the length of the upstream section of active fiber 9, when combined with the pumping power specified and the amount of dopant present therein, is selected to give a gain of 10 dB; the length of the downstream active fiber section 3 is selected to provide a gain of 28 dB, thereby the overall gain of the amplifier 1 is 38 dB.

This amplifier has shown a sensitivity of $-45$ dBm at 565 Mbit/s, with probability for error $P_E = 10^{-4}$.

For comparison purposes, a single stage amplifier 41 of the type shown in said application Ser. No. 839,056 has been made with the construction shown schematically in FIG. 2.

The amplifier 21, which is connected serially in a line optical fiber 22, comprises a single active fiber section 23 and a dichroic coupler 24 connected serially along the fiber 22, upstream of the active fiber section 23.

Through the coupler 24, the active fiber 23 is fed, in the same direction as the signal, a pumping energy supplied by a laser diode 25 on an optical fiber 26 connected to the coupler. First and second optical isolators, 27 and 28, are connected serially in the fiber 22, respectively upstream of and downstream from the active fiber 23.

The active fiber 23 is a silicon fiber doped with germanium, having numerical aperture $NA = 0.19$ and cut-off wavelength $\lambda = 900$ nm. This fiber 23 is made active by the provision of erbium ($Er^{+++}$ ions) as by doping with $Er_2O_3$.

The optical transmission signal has wavelength $\lambda = 1536$ nm, corresponding to the so-called "third window" where attenuation in the line fiber is at a minimum.

The laser diode 25 has a power of 25 mW and emission wavelength $\lambda = 980$ nm.

Optical coupler 24 is a fused fiber one having an attenuation of 1 dB. Optical isolator 27 has an attenuation of 1.5 dB.

The length of the active fiber section 23, together with the pumping power specified and the amount of dopant present therein ($n_{sp} = 1,1$) is selected for a gain of 38 dB.

This amplifier 21 has shown a sensitivity of $-43.5$ dBm at 565 Mbit/s, with probability for error $P_E = 10^{-4}$.

In comparison, the enhanced sensitivity afforded by the amplifier 1 embodying this invention is self-evident.

The structure of this invention avoids the introduction of passive components before the signal has undergone a first amplification, by virtue of coupler 10 being located downstream from the active fiber 9; this solution, which in a conventional amplifier would entail in itself a decreased gain for a given pumping power over the traditional approach providing the optical coupler upstream of the active fiber, has been selected because the amplifying stage $S_M$ including fiber 9 performs essentially the function of reducing noise, and its gain does not limit the performance of the amplifier as a whole.

The amplification gain sought is achieved through stage $S_v$, which provides the remainder of the gain and is designed and sized to suit this purpose; it has preferably the construction shown, although to meet particular applicational requirements it could also include additional elements, such as means of reflecting the pumping power, a second pumping means to operate in the opposite direction from coupler 4 and laser diode 5 and the like.

We claim:

1. An active fiber optical amplifier for connection in series with a fiber optics telecommunication line and through which a signal is caused to pass in a predetermined direction, said amplifier comprising:
   an upstream amplifying stage and a downstream amplifying stage connected in series with each other and with said downstream amplifying stage disposed in said predetermined direction with respect to said upstream amplifying stage;
   wherein said upstream amplifying stage comprises:
   an upstream active fiber section doped with a fluorescent dopant and having an upstream end for connection to said fiber optics telecommunication line for receiving said signal and a downstream end;
   a first optical coupler connected in series with said downstream end of the upstream active fiber section; and
   first pumping means for supplying pumping energy towards the upstream active fiber section through said first coupler, said first coupler being oriented to cause said pumping energy to travel in said upstream active fiber section in the direction opposite from said predetermined direction;
   wherein the downstream amplifier stage comprises:
   a downstream active fiber section doped with a fluorescent dopant, a second optical coupler connected in series with the downstream active fiber section, pumping means connected to said second optical coupler for supplying pumping energy into the downstream active fiber section through said second optical coupler;

a first optical isolator connected in series between said second optical coupler and said first optical coupler; and a second optical isolator connected in series with said downstream active fiber section and having an output for connection to said fiber optics telecommunication line; and wherein the gain of said upstream active fiber section is selected to be below a predetermined maximum value but above a predetermined minimum value so that the interferometric noise of said upstream active fiber is small as compared to interferometric noise due to said upstream active fiber at gains above said predetermined maximum value and selected so that the combined noise figure of said amplifier is less than the noise figure of said upstream active fiber section.

2. An active fiber optical amplifier according to claim 1, wherein the predetermined minimum value of the gain of said upstream active fiber section is selected so that the contribution to the overall noise figure of said amplifier of the combined components downstream from said upstream active fiber section is less than 1/10 the noise figure of said upstream active fiber section.

3. An active fiber optical amplifier according to claim 2, wherein the predetermined maximum value of the gain of said upstream active fiber section is 100 times lower than the geometric mean of the reflectivities upstream and downstream of the upstream active fiber section.

4. An active fiber optical amplifier according to claim 3, wherein the predetermined maximum value of the gain of said upstream active fiber section is 100 times lower than the geometric mean of the reflectivity from Rayleigh's diffusion through the line fiber upstream of the upstream active fiber section and the reflectivity of the first optical isolator toward the upstream active fiber section.

5. An active fiber optical amplifier according to claim 2, wherein the gain of said upstream active fiber is within the range of 8 to 15 dB.

6. An active fiber optical amplifier according to claim 1, wherein the second optical coupler is located upstream of the downstream active fiber and is oriented to cause pumping energy travel in the downstream active fiber in the same direction as the predetermined signal direction.

7. An active fiber optical amplifier according to claim 1, wherein the core dopant in the active fiber sections is erbium.

8. An active fiber optical amplifier according to claim 1, wherein said first and second optical couplers are fused fiber couplers.

9. An active fiber optical amplifier according to claim 1, wherein the first optical isolator has, toward the upstream active fiber and at the same wavelength as the telecommunication signal, a reflectivity exceeding the reflectivity from Rayleigh's diffusion through the line fiber by no more than 10 dB.

10. A method for amplifying an optical signal in a fiber optics telecommunication line and through which a signal is caused to pass in a predetermined direction by means of an optical active fiber amplifier, comprising the steps of:

amplifying the signal in an upstream amplifying stage having an upstream active fiber directly coupled to the telecommunication line, wherein the gain of said upstream active fiber section is selected to be below a predetermined maximum value but above a predetermined minimum value so that interferometric noise of said upstream active fiber is small as compared to interferometric noise due to said upstream active fiber at gains above said predetermined maximum value and selected so that the combined noise figure of said amplifier is less than the noise figure of said upstream active fiber section, and successively further amplifying the signal in a downstream amplifying stage consecutively connected along the line in the direction of the transmission signal having a gain which is the complement to the desired overall amplifying gain of the amplifier, and preventing reflections of the signal in said line into the downstream amplifying stage.

11. A method according to claim 10, wherein the predetermined minimum value of the gain of said upstream active fiber section is selected so that the contribution to the overall noise figure of said amplifier of the combined components downstream from said upstream active fiber section is less than 1/10 the noise figure of said upstream active fiber section.

12. A method according to claim 10, wherein the predetermined maximum value of the gain of said upstream active fiber section is 100 times lower than the geometric mean of the reflectivities upstream and downstream of the upstream active fiber section.

13. A method according to claim 10, wherein the predetermined maximum value is 100 times lower than the geometric mean of the reflectivity from Rayleigh's diffusion through the line fiber upstream of the upstream active fiber and the reflectivity of the downstream amplifying stage toward the upstream active fiber.

* * * * *